United States Patent
Kattwinkel (10) Patent No.: US 7,974,237 B2
(45) Date of Patent: Jul. 5, 2011

(54) COST EFFICIENT SPECTRAL-REUSE TRANSCEIVER

(76) Inventor: Bryan Kattwinkel, Palm Bay, FL (US)

( * ) Notice: Subject to any disclaimer, the term of this patent is extended or adjusted under 35 U.S.C. 154(b) by 194 days.

(21) Appl. No.: 12/172,124

(22) Filed: Jul. 11, 2008

(65) Prior Publication Data

US 2009/0074033 A1    Mar. 19, 2009

Related U.S. Application Data (63) Continuation-in-part of application No. 11/532,306, filed on Sep. 15, 2006, and a continuation-in-part of application No. 10/730,753, filed on Dec. 8, 2003, now Pat. No. 7,457,295.

(60) Provisional application No. 60/784,105, filed on Mar. 20, 2006.

(51) Int. Cl.
    *H04W 4/00*    (2009.01)

(52) U.S. Cl. .............. 370/328; 370/332; 370/338
(58) Field of Classification Search ............... None
     See application file for complete search history.

(56) References Cited

U.S. PATENT DOCUMENTS

| | | | |
|---|---|---|---|
| 6,298,081 B1 * | 10/2001 | Almgren et al. | 375/132 |
| 6,847,826 B1 * | 1/2005 | Wesby et al. | 455/502 |
| 7,295,844 B1 * | 11/2007 | Moon et al. | 455/445 |
| 7,366,223 B1 * | 4/2008 | Chen et al. | 375/132 |
| 2004/0240526 A1 * | 12/2004 | Schmandt et al. | 375/135 |
| 2005/0215284 A1 * | 9/2005 | Su et al. | 455/556.2 |
| 2005/0250502 A1 * | 11/2005 | Laroia et al. | 455/447 |
| 2005/0286466 A1 * | 12/2005 | Tagg et al. | 370/329 |

* cited by examiner

Primary Examiner — Jayanti K Patel
Assistant Examiner — Anthony Sol
(74) Attorney, Agent, or Firm — Michael Cesarano; Feldman Gale, P.A.

(57) ABSTRACT

An operational mechanism enables frequency re-use techniques, including selective frequency hopping and channel aggregation, on very low-cost transceiver hardware.

8 Claims, 6 Drawing Sheets

COST EFFICIENT SPECTRAL-REUSE TRANSCEIVER

CROSS-REFERENCE TO RELATED APPLICATIONS

The present application is a continuation-in-part of U.S. application Ser. No. 11/532,306, filed Sep. 15, 2006 (hereinafter referred to as the '306 application) which claims benefit under 35 USC Section 119(e) of U.S. application No. 60/784,105 and is also a continuation-in-part of U.S. application Ser. No. 10/730,753, filed Dec. 8, 2003 now U.S. Pat. No. 7,457,295, (hereinafter referred to as the '753 application), which claims benefit under 35 USC Section 119(e) of U.S. Patent Application Ser. No. 60/784,105, filed Mar. 20, 2006. The disclosures of each of these applications is herein incorporated by reference in its entirety.

FIELD OF THE INVENTION

The present invention relates in general to communication systems and subsystems thereof, and is particularly directed to an 'cost-efficient' embodiment that may be employed by the communications controller of a spectral reuse in transceiver (transceiver) of a communication system of the type disclosed in the above-identified '753 application, to enable spectral-reuse methods in transceivers having many of the benefits of the communication system disclosed in the above identified '753 applications, having minimal processor and memory capability.

BACKGROUND OF THE INVENTION

As described in the above-identified '753 application, in some radio bands, such as the 217-220 MHz VHF band, as a non-limiting example, governmental licensing agencies (e.g., the Federal Communications Commission (FCC)) customarily grant primary licensees non-exclusive use of the band for a variety of communication services, such as push-to-talk voice transmission. These primary users pay for this licensed use with an expectation that they will not encounter interference by other users. The FCC also allows secondary users to access the same band and the same channels within the band on a 'non-interfering' or secondary basis, whereby a channel may be used by a secondary, non-licensed, user, so long as the primary user is not using that channel.

The FCC and similar agencies in foreign countries are continually looking for ways that allow expanded use of these licensed radio frequency bands, without reducing the quality of service available to the primary users. For secondary users, these bands provide a cost-free opportunity with excellent radio transmission properties for telemetry and other applications. Because secondary users must not interfere with primary users, complaints of interference from a primary user to the FCC may result in its issuing an administrative order requiring that the secondary user move to another portion of the band or leave the band entirely. Such a spectral transition is disruptive to the secondary user's service and can be expensive, especially if site visits, equipment modification, or exchange are required, in order to implement the mandated change. It will be appreciated, therefore, that there has been a need for a mechanism that allows a secondary-user to employ a licensed band on a non-interfering basis and will adapt the radio's frequency usage should new primary users appear. It should be noted that primary users always have priority over secondary users, there is no first-use channel frequency right for secondary users.

Advantageously, the invention described in the above-referenced '753 application successfully addresses this need by means of a monitored spectral activity-based link utilization control mechanism. Briefly reviewing this link utilization control mechanism, which may, without limitation, be used in a star-configured communication system, such as that depicted in the reduced complexity diagram of FIG. 1, a spectral reuse transceiver installed at a master site 10 communicates with respective spectral reuse transceivers installed at a plurality of remote sites 12. Each spectral reuse transceiver operates with a selectively filtered form of frequency hopping for producing a sub-set of non-interfering radio channels or 'sub-channels'. It should be noted here that other configuration or network topologies may be used consistent with the invention disclosed herein. Thus the invention may be used with radio links between transceivers in other topologies, such as point-to-point, and individual links in mesh networks, without limitation, consistent herewith.

For this purpose, the master site 10 periodically initiates a clear sub-channel assessment routine, in which the master site and each of the remote sites 12 participate, in order to compile or 'harvest' a list of non-interfering or 'clear' sub-channels (such as 6.25 kHz wide sub-channels), which may be used by participants of the network for conducting communication sessions that do not ostensibly interfere with any licensed user. By transmitting on only (clear) sub-channels, a respective site's spectral reuse transceiver is ensured that it will not interfere with any primary user of the band of interest.

Except when it is transmitting a message to the master site, each remote user site sequentially steps through and monitors a current list of clear sub-channels (that it has previously obtained from the master site), in accordance with a pseudo-random (PN) hopping sequence that is known a priori by all the users of the network, looking for a message that may be transmitted to it by the master site transceiver. During the preamble period of any message transmitted by the master site, each remote site's transceiver scans all frequency bins within a given spectrum for the presence of energy. Any bin containing energy above a prescribed threshold is marked as a non-clear sub-channel, while the remaining sub-channels are identified as clear and therefore available for reuse sub-channels.

Whenever a remote site notices a change in its clear sub-channel assessment, it reports this to the master site at the first opportunity. As the master site has received clear sub-channel lists from all the remote sites, it logically combines all of the clear sub-channel lists, to produce a composite clear sub-channel list. This composite clear sub-channel list is stored in the master site's transceiver and is broadcast to all of the remote sites over a prescribed one of the clear sub-channels that is selected in accordance with a PN sequence through which clear sub-channels are selectively used among the users of the network. When the composite clear sub-channel list is received at a respective remote site it is stored in its transceiver.

To ensure that all communications among the users of the network are properly synchronized (in terms of the (composite) clear sub-channel list and the order through which the units traverse, or 'hop' through, the clear sub-channel entries of the clear sub-channel list), the master site's transceiver transmits an initialization message on an a priori established clear sub-channel, which each of the remote units monitors. This initialization message contains the clear sub-channel list, an identification of the preamble channel, a PN sequence tap list, and a PN seed that defines the initial sub-channel and hopping sequence for the duration of an upcoming transmit burst. Once a remote site has received an initialization message, that site will transition to normal multiple access mode.

For further details of the architecture and operation of the spectral reuse link control mechanism disclosed in the above-referenced '753 application, attention may be directed to that document. They will not be detailed here, in order to focus the present description on the problem of a 'cost efficient' embodiment, whereby lower-end processors, smaller memory devices, and lower system requirements may be used, thereby lowering the cost of manufacture and deployment of a spectral reuse communication system, while preserving many of the benefits of spectral reuse.

SUMMARY OF THE INVENTION

In accordance with the present invention, this 'cost efficient' goal is successfully addressed by proscribing a set of operating parameters described in the '753 applications, including the number of carriers simultaneously transmitted ('multi-carriers'), the sub-channel size (typically in kHz), hopping rate (every 'n' symbols, for example), the hopping pattern, the interference threshold by which the transceiver decides to hop to a new frequency set, and the clear sub-channel assessment period or trigger.

A first of these parameter sets lowers the microprocessing and memory required of the transceiver, so that lower-cost components can be used. A second of these parameter sets further lowers the microprocessing and memory required of the transceiver and improves the clear sub-channel assessment.

In another embodiment of the present invention, a parameter set will be chosen so that the transceiver will 'aggregate' and therefore provide greater re-use of said licensed channels. This embodiment uses the example of occasional-use voice channels by which the present embodiment provides data service during periods of non-voice usage.

In another embodiment of the present invention, the transceiver provides increased upstream bandwidth through the use of a plurality of receiver circuits.

DETAILED DESCRIPTION

Before describing the details of the 'cost efficient' spectrum reuse transceiver of the present invention, it should be observed that the invention essentially involves special cases of the sub-channel hopping control mechanism executed by the communications control processor of the spectral reuse transceiver of the type disclosed in the above-referenced '753 application, that involves the execution of one or more prescribed discriminators or sub-channel selection filters, so as to effectively reduce the receiving end of a transceiver link. As will be described, these filter functions are readily implemented by appropriately setting the configuration parameters used by the communications controller of the transceiver disclosed in the '753 application to control the operation of the transceiver. The architecture of the transceiver of the '753 application remains unchanged, except as noted. As a consequence, the present invention has been illustrated in the drawings by readily understandable diagrammatic illustrations, which include a generalized network architecture diagram, and a sub-channel sub-division diagram, that show only those details that are pertinent to the invention, so as not to obscure the disclosure with details which will be readily apparent to one skilled in the art having the benefit of the description herein.

As pointed out briefly above, an essential objective of the invention is to effectively cost-reduce the transceiver selection of transceiver parameters. Non-limiting, but preferred examples of such parameters include: 1—limiting number of carriers that the transceiver can simultaneously transmit; and 2—limiting the rate of sub-channel hopping. The operation and effect of each of these and other parameters will be discussed individually below.

Figure 1:
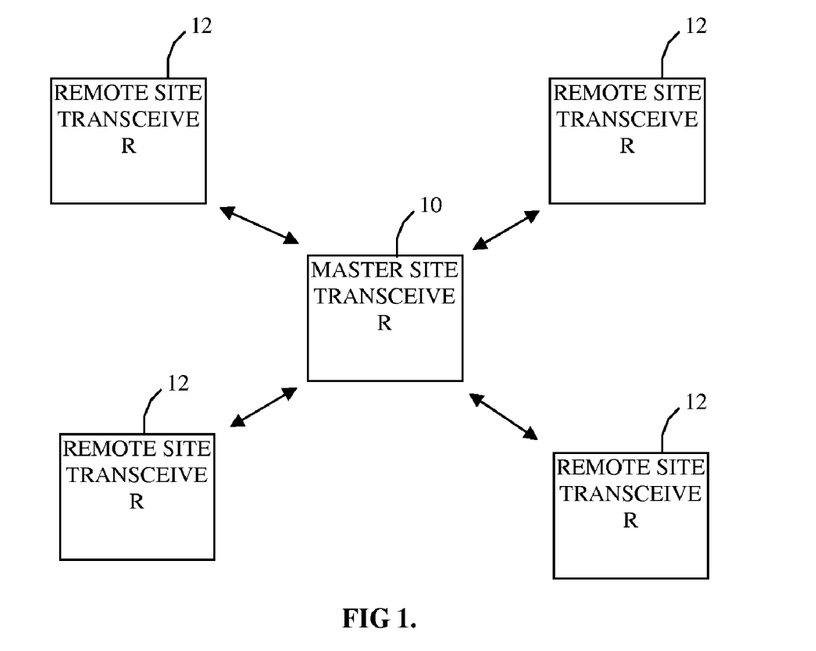
FIG. 1 diagrammatically illustrates the overall architecture of a communication network, with respective terminal unit transceiver sites which employ the spectral reuse transceiver of the invention disclosed in the above-referenced '753 application.

FIG. 1, as described earlier, graphically illustrates spectral reuse transceiver, of the type described in the above-referenced '753 application, installed at a master site 10 communicates with respective spectral reuse transceivers installed at a plurality of remote sites 12. Each spectral reuse transceiver operates with a selectively filtered form of frequency hopping for producing a sub-set of non-interfering radio channels or sub-channels.

Figure 2:
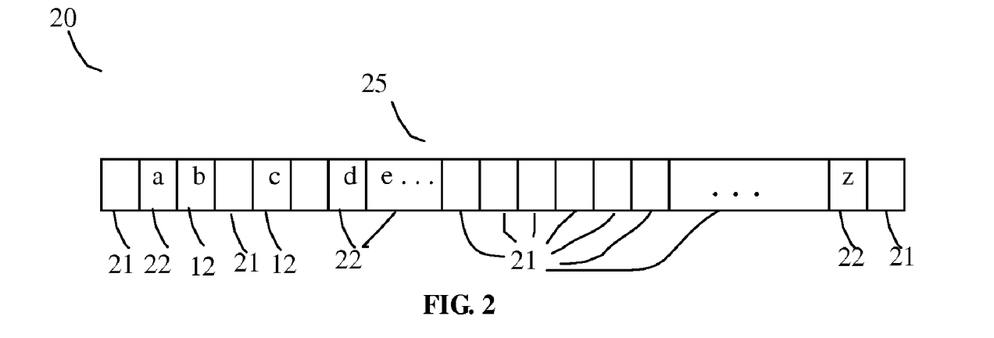
FIG. 2 graphically illustrates the division of usable channels into a selected subset and the remainder of the channels into an unselected subset. In one [all] embodiment(s), the transceiver will only use the selected subset of channels.

To facilitate an understanding of the functionality and effect of the first discriminator—division of available channels—attention may be directed to FIG. 2, which graphically illustrates an instance of a hopping sequence of the type described in the above-referenced '753 application. In graph 20 of FIG. 2, a frequency band 25, is comprised of unused channels 21, that are not in the hopping sequence, and hopping channels 22, marked with the letters a-z in the figure, that are in the present hopping sequence. In some embodiments of the present invention, described below, one of said hopping channels 22a-z, the currently selected hopping sub-channel, the 'operational sub-channel', will be selected for use for transmission and reception. In another embodiment of the present invention, described herein below, an additional hopping sub-channel, 'the receive-only sub-channel' will be selected as a secondary receiving sub-channel. Unused channels 21 and hopping channels 22a-z may be of any sub-channel size, including without limitation 6.25 kHz, 12.5 kHz and 25 kHz, i.e. or example. The hopping sequence instance illustrated in the figure is representative, and may vary in length, according to application requirements, band conditions which can, for example, include interference, and regulatory matters. The number of hopping channels 22a-z that may be used simultaneously may vary according to the transceiver design and application requirements, band conditions such as including interference, regulatory matters, and administrative settings of the transceiver. For example, a transceiver of the type described in the above-referenced '753 application may transmit one to sixty hopping channels 22 simultaneously, in one physical embodiment thereof, as an example. The transceiver may dwell on this set of simultaneously transmitted channels for a parameterized period, and then move to another subset of the hopping channels 22. The order in which the hopping channels 22 are used in the '753 application transceiver may be determined by a parameterized, i.e. administratively determined', fixed order or may be determined pseudo-randomly, for example, through a PN sequence circuit or software, as is well-known to one skilled in the art. The transceiver described in the '753 application could also automatically modify the set of hopping channels 22a-z it uses to avoid interfering signals that might occur from time to time, excluding those current hopping channels 22 that presently have interfering signals thereon.

For the purposes of reducing the hardware costs of the transceiver of the present invention, some or all of the operating parameters describe above may be set advantageously. For example, the number of simultaneously transmitted hopping channels 22 may be reduced to a few or one hopping sub-channel 22a-z, and the hopping sequence may be restricted to an administratively determined fixed set of hopping channels 22a-z, and the dwell time for transmitting on the same sub-channel may be unlimited, until, as will be shown below in the description of additional figures, when the presently used hopping sequence 22a-z is interfered with, in which case another hopping sub-channel in the set of hopping channels 22a-z will be selected. By making these advantageous selections of the operating parameters of the present invention, the processing power and memory requirements for the transceiver's one or more control processors may be significantly reduced, thereby reducing cost and reducing energy requirements.

Figure 3A:
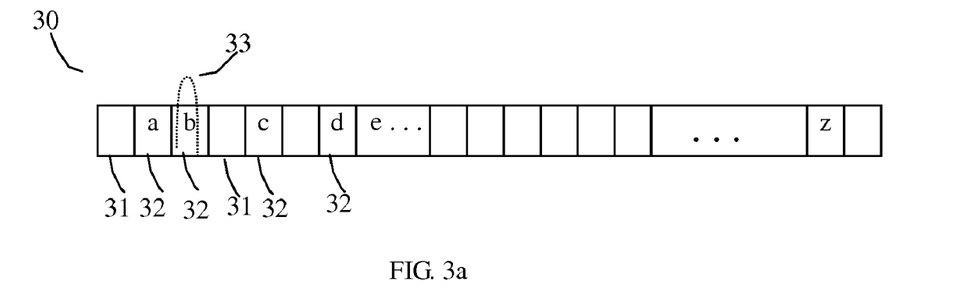
FIGS. 3a-c illustrate an example hopping sequence through the usable channels according to the present invention, and the relationship between an interfering signal and a set of usable channels.
Figure 3B:
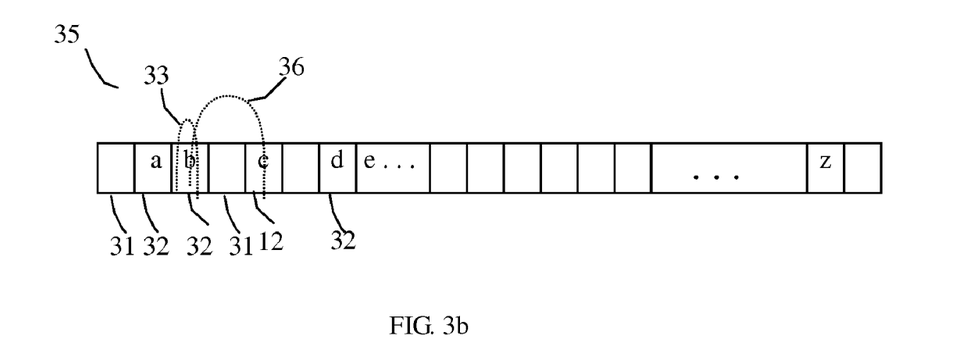
Figure 3C:
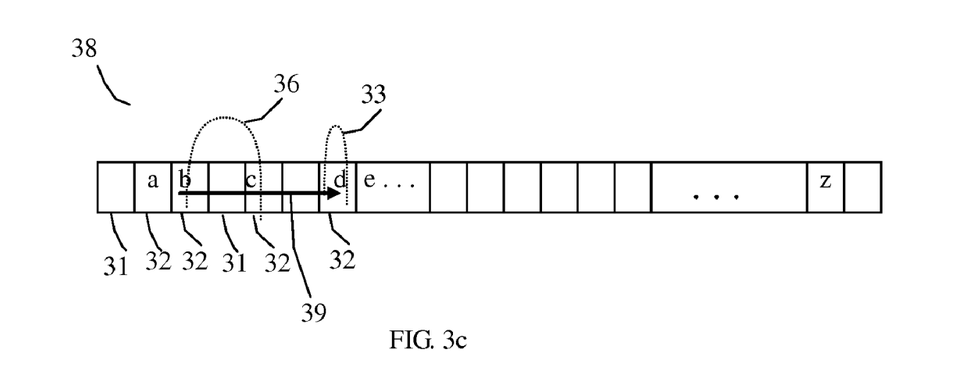

Refer now to FIGS. 3a to 3c, which graphically illustrate the relationship between an interfering signal and a hopping sequence in a spectral reuse transceiver of the present invention. In graph 30 of FIG. 3a, a frequency band 34 comprises unused channels 31 and hopping channels 32a-z, where the unused channels are administratively blocked from use. The hopping channels 32a-z form a 'logical band' of 'sub-channels' in which the transceiver (not shown) may operate. As shown in the figure, the transceiver is transmitting one signal 33, the operational hopping sub-channel, which happens to be in hopping sub-channel 32b. No interfering signals are represented in the figure. The transceiver is transmitting in only one sub-channel, which is the preferred embodiment of the present invention.

Graph 35 of FIG. 3b is similar to graph 30 of FIG. 3a, except that an interfering signal 36 has appeared in FIG. 3b; interfering signal 36 happens to span two hopping channels 32b-c and the unused sub-channel 31 therebetween. The transceiver of the present invention would detect the interfering signal 36, as will be described in the description of subsequent figures herein, and determine that it interferes with the transceiver's single signal 33 in hopping sub-channel 32b.

Graph 38 of FIG. 3c is similar to graph 35 of FIG. 3b. Graph 38 illustrates that the transceiver of the present invention noticed that interfering signal 36 appeared and is interfering with used channels 22b and 22c; the said transceiver therefore moves transmitting signal 33 from hopping sub-channel 32b to hopping sub-channel 32d, as illustrated by arrow 39. The transceiver did not choose any unused sub-channel 31 because they are administratively blocked from use, and did not choose hopping sub-channel 32-c, because hopping sub-channel 32c also is interfered with by interfering signal 36. The transceiver of the present invention therefore selected the next hopping sub-channel 32a-z in its list of hopping channels, hopping sub-channel 32d, in this example.

In another embodiment of the present invention, the transceiver (not shown) in graph 38 of FIG. 3c, after detecting interfering signal 36 has interfered with hopping channels 22b and 22c, rather than selecting the next hopping sub-channel 32a-z in its list, selects the best hopping sub-channel 32a-z in its list of hopping channels 32, based on a comparison of measurements of signal strengths of all hopping channels 32a-z, the measurements being made by all transceivers in the network and combined into a composite measurement by one of the transceivers, typically the base station transceiver in star networks. The said measurements, said combining of measurements, and said selection of the next hopping sub-channel 22a-z will be described in the descriptions of subsequent drawings herein below.

A sub-channel assessment and selection mechanism, shown in the flowchart of FIG. 4a and described below, involves a base station radio incrementally 'sweeping' the transmission frequencies, for example, from the lowest hopping sub-channel to the highest available hopping sub-channel, during a period when transceivers in the network are known not to be transmitting, thereby detecting interfering signals while avoiding falsely detecting other radios in the network as interference. After an 'init' initialization phase, a transmission and reception cycle begins (not shown), during which a spectrum analysis process begins, illustrated by FIG. 4a. During sample spectrum period 404, the base station transceiver scans the available sub-channels in which the transceiver is operating during a time in which no other radios in the network are operating. For example, in the non-limiting example of a polled star network, the base station can choose a said sample spectrum period 404 after a poll-response period and before the base station transceiver transmits the next poll message. In another example, the base station transceiver can transmit a signal that informs the remote stations that a no-transmit period has begun, after which a sample spectrum period 404 may begin. During the sample spectrum 404 period, the base station transceiver measures and records the signal level of each of the hopping channels. Then assessment period 406 begins during which time the base station compares the hopping sequence currently being used with the signal level measurements made in the sample spectrum 404 step described above. The transceiver determines which of the hopping channels currently in use now have interfering signals thereon, 'new interference'). If there is any new interference, the transceiver notes that a new hopping sequence must be constructed that excludes the still active old interference and the new interference. The transceiver also determines which hopping channels not in the current hopping sequence no longer have interference thereon ('newly interference free') By adding the newly interference free sub-channels to the present hopping sequence and subtracting the new-interference sub-channels from the hopping sequence, a new 'candidate' hopping sequence may be constructed. As is well-known to one skilled in the art, the reuse of newly interference free sub-channels may be advantageously delayed by applying a minimum period of absence of interference, hysteresis, or a similar filter to prevent a sub-channel from "ping-ponging" between use and non-use due to an inconsistent or unpredictable interference signal.

Once assessment period 406 is complete, the base station transceiver has a candidate new hopping sequence if a new interference pattern had emerged. In the preferred embodiment of the present invention, the candidate hopping sequence is further filtered by interference reports reported to the base station transceiver from a remote transceiver (or the far end of a point-to-point connection, for example), as indicated by the merge interference 408 step of FIG. 4a. In the merge interference 408 step, any interference report from a remote or far station that has been received since the last merge interference 408 period is merged with the interference data measured by the remote station. The remote or far transceiver's interference-measurement and reporting mechanism is described below in FIG. 4b and the description thereof. If no new interference was detected by the base station transceiver and no new interference was detected and reported by any remote or far transceiver, then by decision block 410 and path 412, the base station transceiver returns to the sample spectrum 404 period; otherwise, in step 416, the base station transceiver creates a new clear sub-channel map from the merged interference data of step 408, said clear sub-channel map comprising a list of hopping sub-channels that are interference free. The base station transceiver then creates a new sub-channel hopping sequence from the said clear sub-channel map and selects a new hopping sub-channel or sub-channels from the said clear sub-channel map, if the current hopping sub-channel is now being interfered with. The said selection being, for example, the next sub-channel or sub-channels in the said clear sub-channel map. In step 418, the base station transceiver disseminates the new sub-channel hopping sequence and the new current hopping sub-channel or sub-channels to the remote or far transceivers, for example, by transmitting a management message to said remote or far transceivers. The base station transceiver then returns to step 404 to begin a new cycle of interference detections. Note that the base station transceiver can jump from a transmit and receiver period (not shown) via entry point 409 to Merge Interference step 408 any time a remote or far transceiver reports new interference.

A sub-channel assessment and selection mechanism, shown in the flowchart of FIG. 4b and described below, involves a remote or far transceiver ('remote transceiver') incrementally 'sweeping' the transmission frequencies, for example, from the lowest hopping sub-channel to the highest available hopping sub-channel, during a period when transceivers in the network are known not to be transmitting, thereby detecting interfering signals while avoiding falsely detecting other radios in the network as interference. After an 'nit' initialization phase, a transmission and reception cycle begins (not shown), during which a spectrum analysis process begins, illustrated by FIG. 4b. During sample spectrum period 444, the remote transceiver scans the available sub-channels in which the transceiver is operating during a time in which no other radios in the network are operating. For example, in the non-limiting example of a polled star network, the base station can choose a said sample spectrum period 444 after a poll-response period and before the base station transceiver transmits the next poll message. In another example, the base station transceiver can transmit a signal that informs the remote stations that a no-transmit period has begun, after which a sample spectrum period 444 may begin. During the sample spectrum 444 period, the remote transceiver measures and records the signal level of each of the hopping sub-channel's 'assessment data', the present list of hopping sub-channels having been transmitted to remote transceivers by the base station transceiver. Then assessment period 446 begins during which time the remote transceiver compares the hopping sequence currently being used with the assessment data of step 444, described above. The remote transceiver determines and notes which of the hopping sub-channels currently in use now have newly interfering signals thereon and which hoping sub-channels are newly absent of interference.

Once assessment period 446 is complete, the remote transceiver begins merge interference step 448. In step 448, if there is new interference or new absence of interference on any hopping sub-channels, the remote transceiver will merge the assessment data of step 446 with the present system-wide hopping sub-channel interference previously provided by the base station transceiver, wherein the merged data will include an indication of newly detected interference and newly detected lack of interference. In decision block 450, the remote transceiver will return to step 444 via path 452 if said merged data indicates that no newly detected interference and no newly detected lack of interference was found in step 448; otherwise, step 456 begins. In step 456, the remote transceiver sends said merged data to the base station transceiver, for example, in a maintenance message which may, without limitation, be sent asynchronously, periodically or when polled by the base station transceiver. The remote transceiver then returns to begin a new sample spectrum period 444.

Figure 4A:
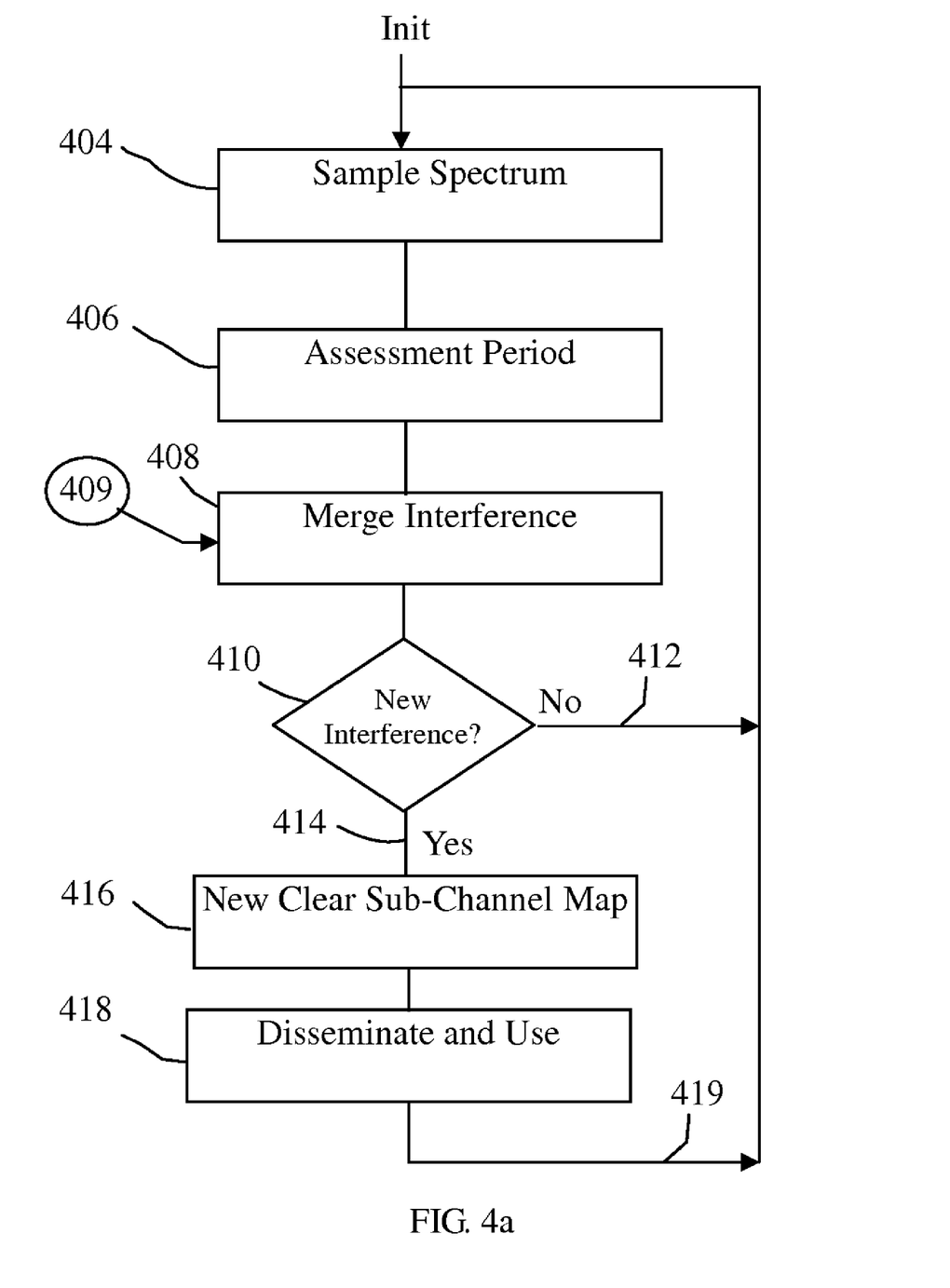
FIG. 4a-b is a flowchart of a routine for implementing a sub-channel discriminator to select a hopping sequence according to an embodiment of the present invention.
Figure 4B:
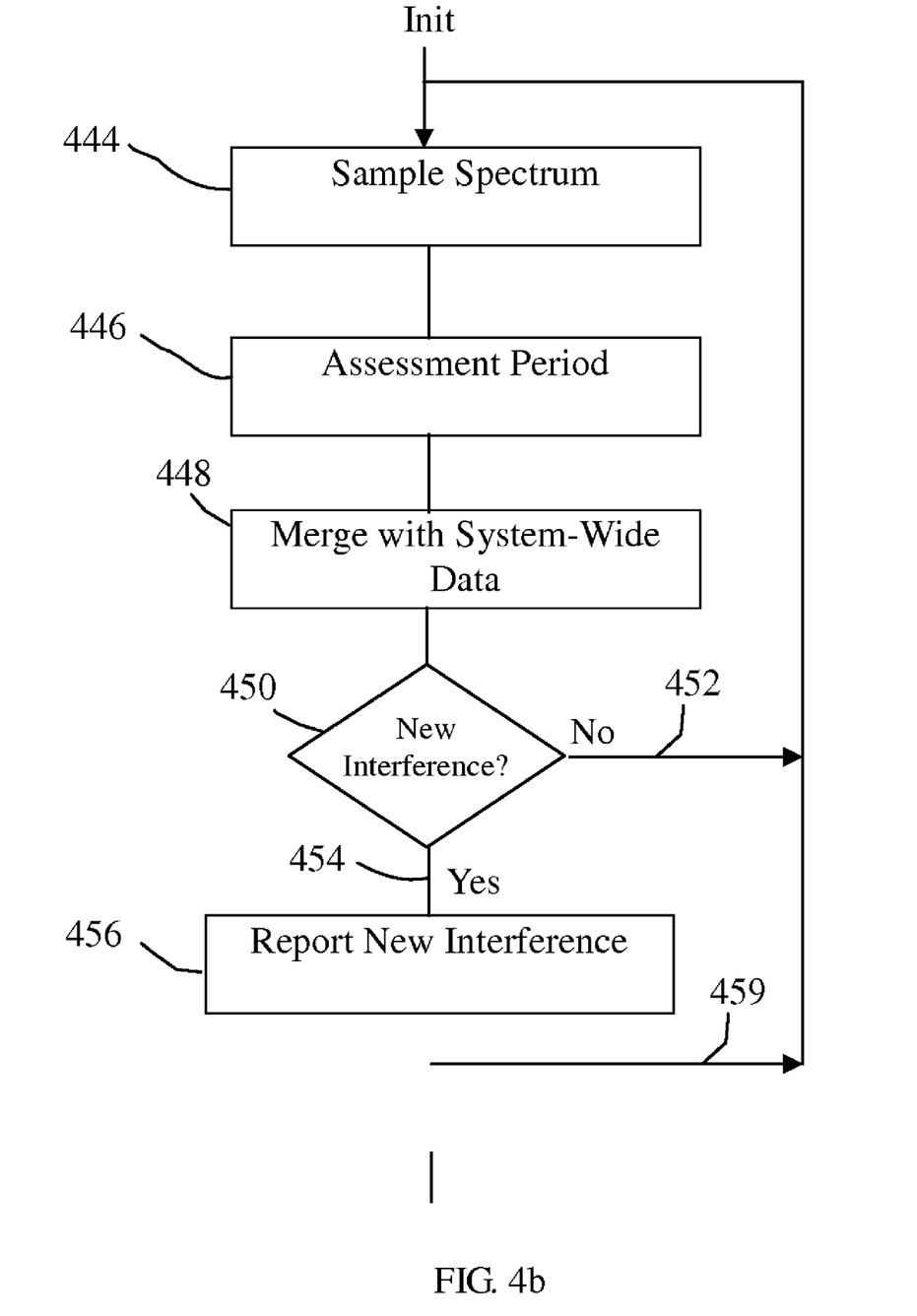

In another embodiment of the present invention, during assessment period 406 of FIG. 4a and assessment period 446 of FIG. 4b, the base station and each of the remote transceivers detect interference in each hopping sub-channel by measuring the signal strength, typically the RSSI value for each of said hopping channels; during the assessment reporting period, the said RSSI value for each of said hopping channels is included in the assessment report. In the subsequent new clear sub-channel map period 416 of FIG. 4a, the base station transceiver uses the said RSSI value and a threshold parameter therefor to determine if a hopping sub-channel has an interfering signal.

In another embodiment of the present invention, during the new clear sub-channel map period 416 of FIG. 4a, the base station transceiver selects a new hopping sub-sub-channel by choosing a hopping sub-sub-channel with the lowest RSSI value.

In another embodiment of the present invention, during new clear sub-channel map period 416 of FIG. 4a, the base station transceiver selects a new hopping sub-channel by choosing a hopping sub-channel with the lowest RSSI value below a threshold parameter therefor. If there is no hopping sub-channel with a said lowest RSSI value below a said threshold parameter, then, according to a policy configured, for example, in the base station transceiver software, the base station transceiver may select a hopping sub-channel with a said lowest RSSI value, or cease transmitting until an interference-free hopping sub-channel becomes available, or lower its transmit power, or lower its throughput rate, or a combination thereof, or similar policies well-known to one skilled in the art.

In another embodiment of the present invention, during new clear sub-channel map period 416 of FIG. 4a, the base station transceiver avoids selecting a new hopping sub-channel that is adjacent to the current hopping sub-channel.

In another embodiment of the present invention, during sample spectrum period 404 of FIG. 4a, the base station transceiver avoids selecting a new hopping sub-channel that is adjacent to the current hopping sub-channel.

In another embodiment of the present invention, the base station transceiver is a full-duplex radio and selects a pair of interference-free channels rather than a single sub-channel (for half-duplex communications.) In another embodiment of the present invention, the media access protocol is not poll-response, but is aloha, slotted-aloha, TDD, TDMA, or another media access protocol well-known to one skilled in the art.

A sub-channel assessment and selection mechanism, shown in the flowchart of FIG. 5a and described below, involves a base station radio incrementally 'sweeping' the transmission frequencies—for example, from the lowest hopping sub-channel to the highest available hopping sub-channel, during a period when transceivers in the network are known not to be transmitting, thereby detecting interfering signals while avoiding falsely detecting other radios in the network as interference. After an 'init' initialization phase, a remote transmit and receive period 51 begins. The base station transceiver begins a poll-response period with the remote transceivers, in the non-limiting example of a polled star network. After the conclusion of the remote transmit and receive period 51, the base station sends a message to all remotes, thereby starting an assessment period 52 during which time no remote or base station transceiver is transmitting. During this assessment period 52, each remote and the base station measures the signal level of each of the hopping channels. At the end of assessment period 52, the base station begins assessment reporting period 53 by polling each remote for its 'assessment report', sent via one or more assessment report messages. Each remote reports any hopping channels whose signal level is above a threshold parameter ('discriminator') via a said assessment report message. After receiving all said assessment report messages, the base station begins assessment report assembly period 54, combining all said assessment reports into a single 'combined interference report' which shows which hopping channels currently have interference thereon. The base station then performs the current sub-channel interference decision 57. If the said combined interference report indicates that the operational hopping sub-channel has no interference thereon, then by branch 58 the base station returns to its remote transmit and receive period 51; otherwise, the base station performs the new sub-channel select function 59. In the new sub-channel select function 59, the base station selects a new operational hopping sub-channel for which the said combined interference report indicates no interference was found thereon. In one embodiment of the present invention, the next interference-free hopping sub-channel in the hopping sub-channel list is selected. The base station then sends a 'change hopping sub-channel' message to all remotes which instructs said remotes to move to the said new operational hopping sub-channel. The base station changes its present operational hopping sub-channel to the new operational hopping sub-channel and returns to remote transmit and receive period 51. Since interference had been found on the old operational hopping sub-channel, the said change hopping sub-channel message might not be received by one or more of the remotes. Those remotes not receiving the said change hopping sub-channel message will detect that they no longer see the base station's periodic transmission 'signature,' described as a "preamble" in the above-referenced '753 application, and rejoin the network thereat by first searching all the hopping channels until the said base station's transmission signature is found and, in the preferred embodiment, waiting for the next remote transmit and receive period 51 to begin, said period indicated by the receipt of base station poll messages.

In another embodiment of the present invention, during assessment period 52, the base station and each of the remote stations detect interference in each hopping sub-channel by measuring the signal strength, typically the RSSI value for each of said hopping channels; during the assessment reporting period, the said RSSI value for each of said hopping channels is included in the assessment report. In the subsequent new sub-channel select period 59, the base station uses the RSSI value and a threshold parameter therefor to determine if a hopping sub-channel has an interfering signal.

In another embodiment of the present invention, during the new channel select period 59, the base station selects a new hopping sub-channel by choosing a hopping sub-channel with the lowest RSSI value.

In another embodiment of the present invention, during the new channel select period 59, the base station selects a new hopping sub-channel by choosing a hopping sub-channel with the lowest RSSI value below a threshold parameter therefor. If there is no hopping sub-channel with a said lowest RSSI value below a said threshold parameter, then, according to a policy configured in the transceiver software, the transceiver may select a hopping sub-channel with a said lowest RSSI value, or cease transmitting until an interference-free hopping sub-channel becomes available, or lower its transmit power, or lower its throughput rate, or a combination thereof, or similar policies well-known to one skilled in the art.

In another embodiment of the present invention, the base station transceiver is a full-duplex radio and selects a pair of interference-free channels rather than a single sub-channel (for half-duplex communications.) In another embodiment of the present invention, the media access protocol is not poll-response, but is aloha, slotted-aloha, TDD, TDMA, or another media access protocol well-known to one skilled in the art.

Figure 5:
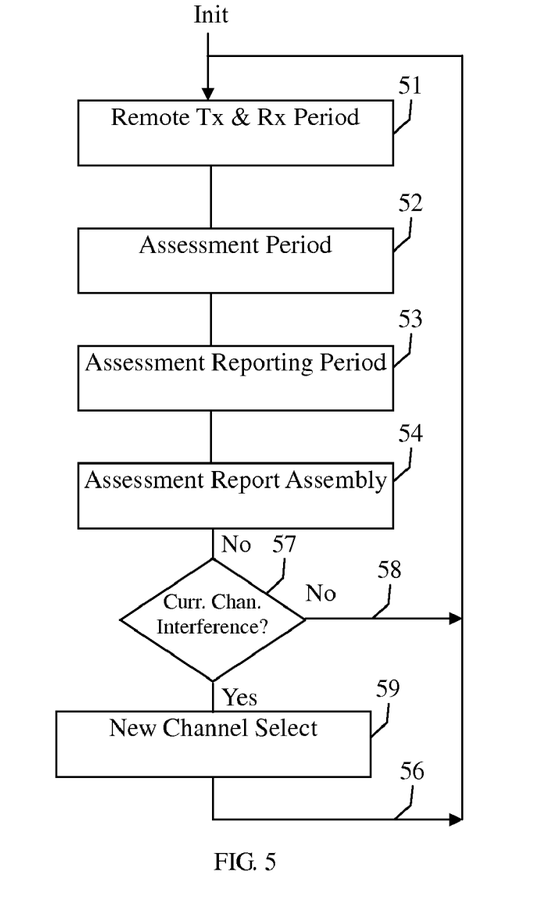
FIG. 5 is a flowchart of a routine for implementing a sub-channel discriminator to select a hopping sequence according to an embodiment of the present invention.
Figure 6:
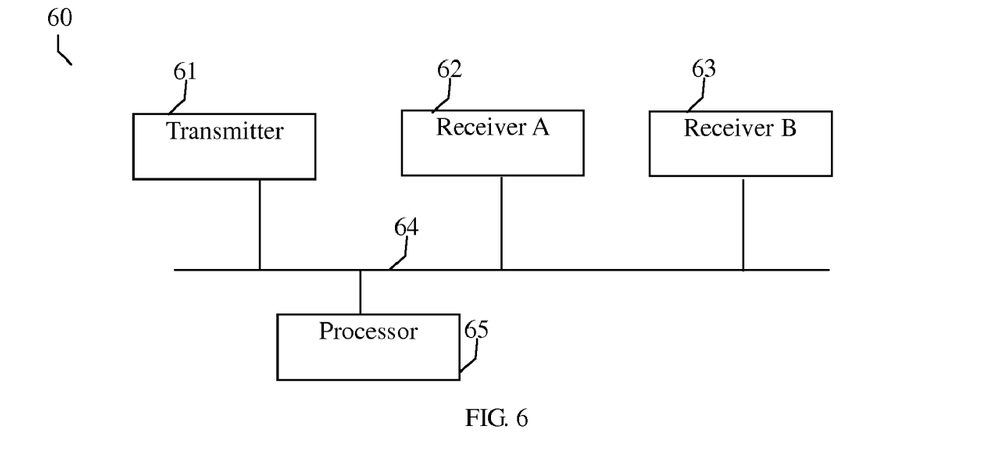
FIG. 6 illustrates a transceiver with two receivers used to aggregate upstream transmissions.

Referring now to FIG. 6, transceiver 60 has one transmitter 61 and two receivers, receiver A 62 and receiver B 63. Transmitter 61 and receivers 62-63 can communicate with processor unit 65 via bus 64. The block diagram of transceiver 60 is simple so as not to obscure the details of the present invention. Transceiver 60 is similar to the transceivers described in the descriptions of FIGS. 1-5 herein, except that it has two receivers 62-63 rather than one receiver. Processor 65 can configure receiver A 62 and receiver B 63 independently so that, for example, transmitter 61 and receiver A 62 are tuned to 'sub-channel 2' and receiver B 63 is tuned to 'sub-channel 3', wherein 'sub-channel 2' and sub-channel 3' represent any two channels at frequencies within the band or bands in which transceiver 60 operates.

According to one embodiment of the present invention, transceiver 60 uses transmitter 61 and one of said receivers 62-63, for user traffic, and uses the other of said receivers 62-63 for scanning hopping channels for interference. This arrangement allows transceiver 60 to scan for interference on the hopping channels even while receiving or transmitting on the operational hopping sub-channel. In one embodiment of the present invention, transceiver 60 scans all hopping channels except the operational hopping sub-channel at any or all times during the periods 51-59 of FIG. 5 and scans the operational hopping sub-channel during the assessment period 52 of FIG. 5. Thus scanning for interference occurs more frequently by use of the second receiver, thereby reducing detection time for interference.

In another embodiment of the present invention, transceiver 60 of FIG. 6 performs scanning of all hopping channels except the current operational hopping sub-channel and hopping channels adjacent to the current operational hopping at any or all times during the periods 51-59 of FIG. 5 and scans the current operational hopping and hopping channels adjacent to the current operational hopping sub-channel during the assessment period 52 of FIG. 5. If the said scanning detects interference on said current operational sub-channel or said channels adjacent to the said current operational sub-channel, then during the new sub-channel select period 59 of FIG. 5, a new operational hopping sub-channel selection will be made, said selection excluding said current operational hopping sub-channel and said channels adjacent to the said current operational sub-channel. Thus scanning for interference occurs more frequently by use of the second receiver and therefore reducing the effect of any "bleeding" of energy from the operational sub-channel into the adjacent channels.

In another embodiment of the present invention, transceiver 60 of FIG. 6 increases throughput upstream (from remote stations towards hub) in a point-to-multipoint network by using the two receivers 62 and 63 simultaneously for receiving user data. Transmitter 61 of a FIG. 6, for example, polls two remote transceivers simultaneously with a polling message that assigns Receiver A's 62 upstream sub-channel frequency to one of said two remote transceivers, and Receiver B's 63 upstream sub-channel frequency to the other one of said two remote transceivers; subsequently, the two said remote transceivers simultaneously transmit a poll response to said poll message. Similarly, two upstream sub-channels may be assigned respectively to the two Receivers 62-63, the channels used for aloha transmissions, where half the remote transceivers are assigned to the aloha sub-channel of Receiver 62 and the other half of the remote transceivers are assigned to the aloha sub-channel of Receiver 63 (or the remote transceivers can pseudo-randomly select one of the two aloha channels). Various ways to use or assign the two upstream channels of Receivers 62-63 will be apparent to one skilled in the art and are anticipated herein. In another embodiment of the present invention, transceiver 60 may use the second receiver 63 increasing upstream throughput and scanning hopping channels for interference, as described above.

Figure 7:
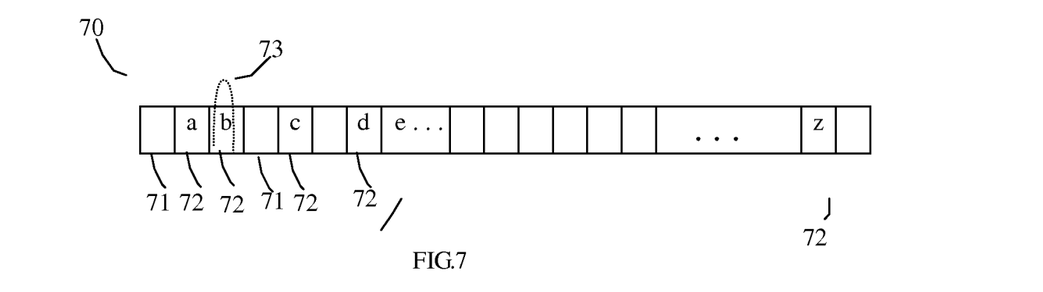
FIG. 7 illustrates an example hopping sequence through the usable channels for the purpose of aggregating channels, according to an embodiment of the present invention.

Refer now to FIG. 7, which graphically illustrates another aspect of the present invention, whereby the transceiver described herein above may be used to aggregate a set of licensed channels to increase utilization of the licensed channels. In the figure, a frequency band 70 comprises a set of unused channels 71 and a set of available channels 72*a-z*, which need not be adjacent. The transceivers of the present invention (not shown) are configured to hop only over the available channels 72*a-z*. The available channels 72*a-z* may be licensed to the owner, as a non-limiting example, for push-to-talk voice communication and will use the present invention to provide data service over the voice channels 72*a-z* whenever the voice channels 72*a-z* are not busy. The transceiver of the present invention will hop over channels 72*a-z*, as described in description of FIGS. 1-6, treating the busy voice channels as if they were "interference." Thus, whenever there is at least one idle voice channel 72*a-z*, the transceiver of the present invention will provide data service thereover. In the figure, there is, as an example, one busy sub-channel 72*b* with a voice signal 73 thereon. Therefore, the transceiver of the present invention may use any of available channels 72*a* and 72*c-z* for data service (including digital voice). FIG. 7 was simplified so as not to obscure the present invention. For example, the channels of the present size need not be the same size as the example voice channels. The transceiver of the present invention could have, for example, 12.5 kHz channels and the voice radios could have 25 kHz channels. Therefore, there would be two channels of the present invention for each voice channel, in this non-limiting example.

Figure 8:
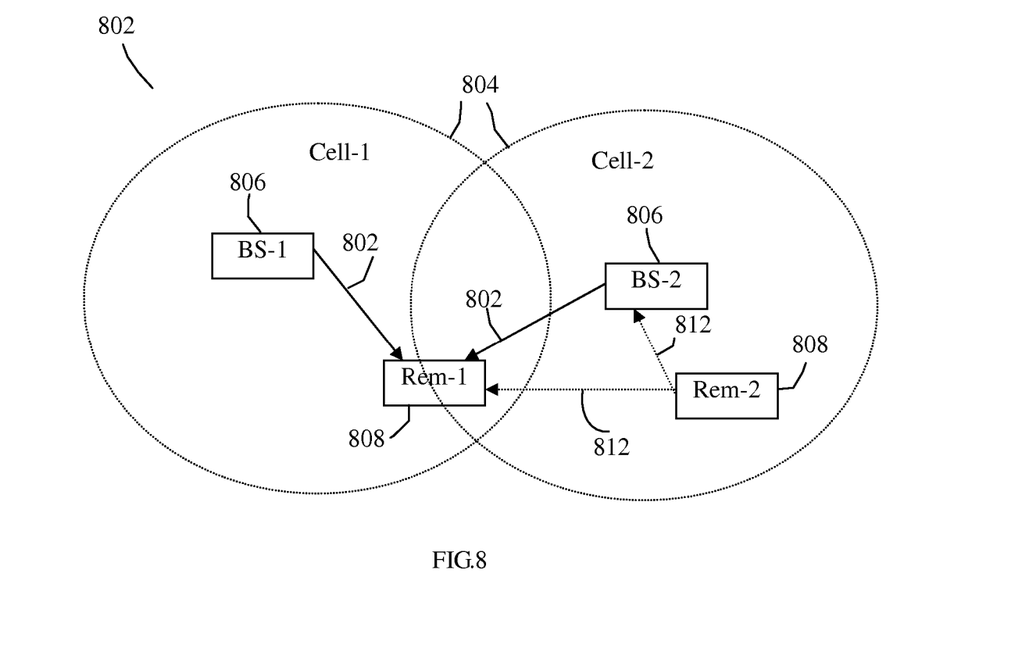
FIG. 8 illustrates a mobile radio with two receivers receiving signals from a plurality of base stations, according to an embodiment of the present invention.

Referring now to FIG. 8, there is a mobile network 802 which, in this non-limiting example, has two cells 804, two base stations 806 and two mobile transceivers 808. One cell 804, Cell-1, has base station BS-1 806 and mobile transceiver 808 Rem-1 within said base station BS-1's area of radio coverage, said area of coverage indicated by the dashed line of 804. The other cell 804, Cell-2, in the present example configuration, has base station BS-2 806 and two mobile transceivers 808, Rem-1 and Rem-2. Mobile transceiver Rem-1 happens to be in the overlapping coverage of Cell-1 and Cell-2 and therefore can receive signals 802 from both base stations BS-1 and BS-2 from Cell-1 and Cell-2, respectively. Furthermore, mobile transceiver Rem-1 is within radio range of the remote radio signals 812 from remote transceiver Rem-2.

Mobile transceiver 808 Rem-1 has two receivers, as described in the descriptions of FIGS. 6 and 7 herein. In another embodiment of the present invention, mobile transceiver Rem-1 uses one of its said two receivers for receiving data transmissions and detecting signal levels from the base station to which it is associated (BS-1 in the present example), and the second of its said two receivers for detecting signal levels from all other base stations 806 within radio range of mobile transceiver Rem-1. As is understood by one skilled in the art, the detection of signal levels from a base station 808 by a mobile transceiver 808 is useful in hand-off procedures, wherein the signal levels 802 from base stations 806 are compared by mobile transceivers 808 to determine whether to dissociate from the presently associated base station 806 to another base station 806 with a stronger signal 802. Various schemes for comparing base station signals 802 to determine the most advantage base station 806 to which to associate are known by one skilled in the art, and are not described herein. The present invention provides several advantages for mobile transceivers. Notably, data transmission time does not need to be interrupted by signal measurements of other base stations since there is a dedicated second receiver for this purpose, thereby increasing useful throughput for the end user. In addition, the media access control (MAC) layer frequently imposes restrictions on mobile transceivers' 808 timing of transmission and receive periods. A mobile transceiver 808 must be listening when a base station 806 is transmitting. With a second receiver, the mobile transceiver 808 may sample base stations continuously, thereby making more timely hand-off decisions. In addition, the mobile transceiver 808 may hear transmissions from both base stations 806 and other mobile transceivers 808. The second receiver enables the mobile transceiver 808 to decode received messages so as to discern between signal levels of base stations 806 and other mobile transceivers 808, so that hand-off decisions are based only on signal levels of base stations 806. In another embodiment of the present invention, base station 806 of a mobile network may use the second receiver of FIG. 6 for increasing upstream throughput or scanning hopping channels for interference, as described above. In another embodiment of the present invention, base station 806 of a mobile network may use the second receiver of FIG. 6 for increasing upstream throughput and scanning hopping channels for interference, as described above.

While we have shown and described several embodiments in accordance with the present invention, it is to be understood that the same is not limited thereto but is susceptible to numerous changes and modifications as known to a person skilled in the art. There is no intention that the application be limited to the details shown and described herein, but it is intended that the application cover all such changes and modifications as are obvious to one of ordinary skill in the art. For example, the transceivers described in the above-identified '753 application may operate in a star network. There is no intention to limit either the '753 application or the instant application to such a configuration and, without limitation, radio links between transceivers in other topologies, such as point-to-point, and individual links in mesh networks, as examples, can employ the cost-reduction and other improvements of the present invention as well.

What is claimed:

1. On a network of frequency hopping spectral reuse transceivers, a method for creating a new frequency hopping sequence over which communications may be conducted by selecting sub-channels for communication comprising the steps of:
   a. a base station transceiver analyzing the spectrum of potential sub-channels over which communications may be conducted wherein said analysis comprises the measurement of signal levels on said sub-channels to determine their suitability for conducting communications by detecting the presence and absence of interfering signals and the recordation of said measurements;
   b. said base station transceiver compiling a sample spectrum of suitable potential sub-channels identified in step a;
   c. said base station transceiver analyzing which sub-channels of the frequency hopping sequence currently in use have new interference;
   d. said base station transceiver determining which sub-channels not currently in the frequency hopping sequence are interference free;
   e. said base station transceiver constructing a new frequency hopping sequence by adding the sub-channels compiled in step b to those sub-channels in the current frequency hopping sequence that are interference free and subtracting those sub-channels identified in step c.
   f. a remote transceiver analyzing the spectrum of potential sub-channels over which communications may be conducted;
   g. said remote transceiver compiling an interference report identifying on which sub-channels the remote transceiver has detected interference;
   h. said remote transceiver sending said interference report to the base transceiver;
   i. said base station transceiver further filtering its new frequency hopping sequence by subtracting those sub-channels identified in said interference report.

2. The method of claim 1 wherein said spectrum analysis comprises the measurement of the received signal strength indicator for each potential sub-channel to determine whether said sub-channel is suitable for conducting communications.

3. The method of claim 2 wherein said base station transceiver compares the received signal strength indicators for each sub-channel to a selected threshold value for determining whether said sub-channel is suitable for conducting communications.

4. The method of claim 3 wherein said base station transceiver selects a new hopping sub-channel with the lowest received strength indicator value below a selected threshold value.

5. The method of claim 2 wherein said base station transceiver selects a new hopping sub-channel for conducting communications by selecting the candidate sub-channel with the lowest received signal strength indicator value.

6. The method of claim 1 wherein said base station transceiver excludes selection of a hopping sub-channel adjacent to the sub-channel currently in use when said base station transceiver constructs a new frequency hopping sequence.

7. The method of claim 1 wherein said base station transceiver excludes selection of a hopping sub-channel adjacent to the sub-channel currently in use when said base station transceiver and said remote transceiver are engaged in spectrum analysis.

8. The method of claim 1 wherein said base station transceiver is a full-duplex radio and wherein said base station transceiver selects a pair of sub-channels from the frequency hopping sequence over which to conduct communications.

* * * * *